US010578001B2

(12) United States Patent
Galamba et al.

(10) Patent No.: US 10,578,001 B2
(45) Date of Patent: Mar. 3, 2020

(54) THERMALLY INSULATIVE, DURABLE, REFLECTIVE CONVOLUTED SLEEVE AND METHOD OF CONSTRUCTION THEREOF

(71) Applicant: Federal-Mogul Powertrain, LLC, Southfield, MI (US)

(72) Inventors: Steve Galamba, West Chester, PA (US); Tianqi Gao, Exton, PA (US); Cassie Malloy, Trappe, PA (US); Wai Kit Ho, Houston, TX (US); Nicholas DePompeo, Avondale, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 199 days.

(21) Appl. No.: 15/892,242

(22) Filed: Feb. 8, 2018

(65) Prior Publication Data

US 2018/0223717 A1     Aug. 9, 2018

Related U.S. Application Data

(60) Provisional application No. 62/457,041, filed on Feb. 9, 2017.

(51) Int. Cl.
*F01N 13/14*     (2010.01)
*F16L 59/02*     (2006.01)
(Continued)

(52) U.S. Cl.
CPC .............. *F01N 13/148* (2013.01); *B32B 1/08* (2013.01); *B32B 3/28* (2013.01); *B32B 5/026* (2013.01);
(Continued)

(58) Field of Classification Search
CPC ......... F16L 59/029; F16L 11/11; B32B 37/14; H02G 2/0468; Y10T 156/1043
(Continued)

(56) References Cited

U.S. PATENT DOCUMENTS 4,509,559 A * 4/1985 Cheetham ................. E04B 1/94
138/121
5,092,122 A 3/1992 Bainbridge
(Continued)

FOREIGN PATENT DOCUMENTS

DE     102012205496 A1    10/2013
JP      H07139347 A        5/1995
WO     2015077670 A1       5/2015

OTHER PUBLICATIONS

International Search Report, dated Apr. 18, 2018 (PCT/US2018/017505).

*Primary Examiner* — Patrick F Brinson
(74) *Attorney, Agent, or Firm* — Robert L. Stearns; Dickinson Wright, PLLC

(57) ABSTRACT

A thermally insulative, flexible, durable reflective exhaust pipe sleeve and method of construction thereof is provided. The sleeve includes a knit, heat-resistant inner layer, a reflective metallic outer layer and an intermediate layer sandwiched between the inner and outer layers. The inner layer is constructed having an inner surface exposed to an inner cavity of the sleeve and the outer layer is constructed having an outer reflective surface exposed to the surrounding environment. The intermediate layer is constructed of a woven material and is sandwiched in abutment with the inner and outer layers. The outer and intermediate layers are convoluted, while the inner layer is cylindrically tubular.

18 Claims, 1 Drawing Sheet

(51) Int. Cl.
- *B32B 3/28* (2006.01)
- *B32B 5/02* (2006.01)
- *B32B 7/12* (2006.01)
- *B32B 15/14* (2006.01)
- *B32B 15/18* (2006.01)
- *B32B 15/20* (2006.01)
- *B32B 17/06* (2006.01)
- *B32B 37/12* (2006.01)
- *B32B 38/18* (2006.01)
- *F01N 13/18* (2010.01)
- *B32B 1/08* (2006.01)

(52) U.S. Cl.
CPC ............ *B32B 7/12* (2013.01); *B32B 15/14* (2013.01); *B32B 15/18* (2013.01); *B32B 15/20* (2013.01); *B32B 17/067* (2013.01); *B32B 37/1207* (2013.01); *B32B 38/1808* (2013.01); *F01N 13/141* (2013.01); *F01N 13/18* (2013.01); *F01N 13/1816* (2013.01); *B32B 2250/03* (2013.01); *B32B 2262/101* (2013.01); *B32B 2307/304* (2013.01); *B32B 2605/08* (2013.01); *F01N 2260/20* (2013.01); *F01N 2470/12* (2013.01); *F16L 59/02* (2013.01)

(58) Field of Classification Search
USPC ........ 138/110, 149, 121, 122, 123, 137, 141
See application file for complete search history.

(56) References Cited

U.S. PATENT DOCUMENTS

| | | | | |
|---|---|---|---|---|
| 6,897,375 | B2* | 5/2005 | Lindner | B60R 16/0215 |
| | | | | 138/121 |
| 6,978,643 | B2* | 12/2005 | Akers | F16L 59/029 |
| | | | | 66/170 |
| 7,647,946 | B2* | 1/2010 | Mirmand | D04B 1/04 |
| | | | | 138/110 |
| 8,505,339 | B2* | 8/2013 | Malloy | F01N 13/148 |
| | | | | 66/170 |
| 9,976,687 | B2* | 5/2018 | Goulet | D04B 1/14 |
| 2007/0251595 | A1* | 11/2007 | Chen | D02G 3/16 |
| | | | | 139/420 C |
| 2012/0082807 | A1* | 4/2012 | Malloy | F01N 13/148 |
| | | | | 428/34.1 |
| 2013/0199656 | A1 | 8/2013 | Sherwin | |
| 2015/0056881 | A1 | 2/2015 | Zhang et al. | |
| 2015/0147498 | A1 | 5/2015 | Aquino et al. | |

* cited by examiner

THERMALLY INSULATIVE, DURABLE, REFLECTIVE CONVOLUTED SLEEVE AND METHOD OF CONSTRUCTION THEREOF

CROSS-REFERENCE TO RELATED APPLICATION

This application claims the benefit of U.S. Provisional Application Ser. No. 62/457,041, filed Feb. 9, 2017, which is incorporated herein by reference in its entirety.

BACKGROUND OF THE INVENTION

1. Technical Field

This invention relates generally to tubular sleeves for protecting elongate members, and more particularly to tubular convoluted sleeves having insulative and reflective properties.

2. Related Art

Standards for vehicle emissions are becoming increasingly stringent. As such, it is a goal is to reduce emissions of nitrogen oxides, hydrocarbon, carbon monoxide, and particulate matter. In order to achieve this goal, it is desired to maintain exhaust emissions at the highest temperature possible in order to allow the gasses and particulate to be burned off prior to being emitted into the atmosphere. Current exhaust systems include tubular sleeves disposes about the exhaust pipe to maintain the exhaust gasses at an elevated temperature; however, the known sleeves have durability issues, such as sleeves of mineral fiber-based sleeves becoming brittle over time from continual exposure to heat and further losing structural integrity upon being impinged by debris and being continually exposed to vibration. Further, known textile sleeves, such as woven or knit sleeves, have a relatively open interlaced structure, thereby allowing oil or other fluids to become trapped within the fabric of the sleeve, which over time can cause thermal incidence issues. In addition, as a result of the minimal thickness of protective textile sleeves, due in part to the limited spaced available, thermal sleeves are often unable to prevent exhaust temperature drop from inlet to outlet locations of the exhaust system.

A sleeve manufactured in accordance with the invention overcomes or greatly minimizes the tendency of a thermally insulative, reflective textile sleeve from becoming embrittled, from becoming damaged by debris, is resistant to fluids, and provides an enhanced ability to prevent the exhaust gasses from decreasing in temperature from inlet to outlet.

SUMMARY OF THE INVENTION

A thermally insulative, flexible, durable reflective exhaust pipe sleeve is provided for minimizing the temperature drop of exhaust gasses traveling through an exhaust pipe. The sleeve includes a knit, heat-resistant inner layer, a reflective metallic outer layer and an intermediate layer sandwiched between the inner and outer layers. The inner layer is constructed having an inner surface exposed to an inner cavity of the sleeve and the outer layer is constructed having an outer reflective surface exposed to the surrounding environment. The intermediate layer is constructed of a woven material and is sandwiched in abutment with the inner and outer layers. The outer and intermediate layers are convoluted, thereby providing the sleeve with an enhanced flexibility to be routed over meandering paths.

In accordance with another aspect of the invention, the outer layer and the intermediate layer are bonded to one another with a thermoset adhesive.

In accordance with another aspect of the invention, the inner layer is knit from mineral fiber-based multifilaments.

In accordance with another aspect of the invention, the intermediate layer is woven from fiberglass multifilament yarns.

In accordance with another aspect of the invention, the outer layer is a metal foil selected from one of aluminum and stainless steel.

In accordance with another aspect of the invention, the outer layer has overlapping regions and non-overlapping regions, wherein the overlapping regions are bonded to one another.

In accordance with another aspect of the invention, a method of constructing an insulative, flexible, durable reflective exhaust pipe sleeve is provided for minimizing the temperature drop of exhaust gasses traveling through an exhaust pipe. The method includes providing a knit, heat-resistant cylindrically tubular inner layer, a reflective metallic outer layer and a woven intermediate layer. Then, bonding the intermediate layer and the outer layer to one another. Further, forming the outer and intermediate layers having a convoluted shape, and disposing the inner layer inside the intermediate layer.

In accordance with another aspect of the invention, the method further includes bonding the intermediate layer and the outer layer to one another with a thermoset adhesive.

In accordance with another aspect of the invention, the method further includes providing the inner layer as a woven fabric knit from mineral fiber-based multifilaments.

In accordance with another aspect of the invention, the method further includes providing the intermediate layer as a fabric woven from fiberglass multifilaments.

In accordance with another aspect of the invention, the method further includes providing the outer layer as a metal foil formed from one of aluminum and stainless steel.

In accordance with another aspect of the invention, the method further includes spiral wrapping the outer layer about the intermediate layer and forming overlapped regions of the outer layer that are bonded to one another.

BRIEF DESCRIPTION OF THE DRAWINGS

These and other aspects, features and advantages of the invention will become readily apparent to those skilled in the art in view of the following detailed description of the presently preferred embodiments and best mode, appended claims, and accompanying drawings, in which:

DETAILED DESCRIPTION OF PREFERRED EMBODIMENTS

Figure 1:
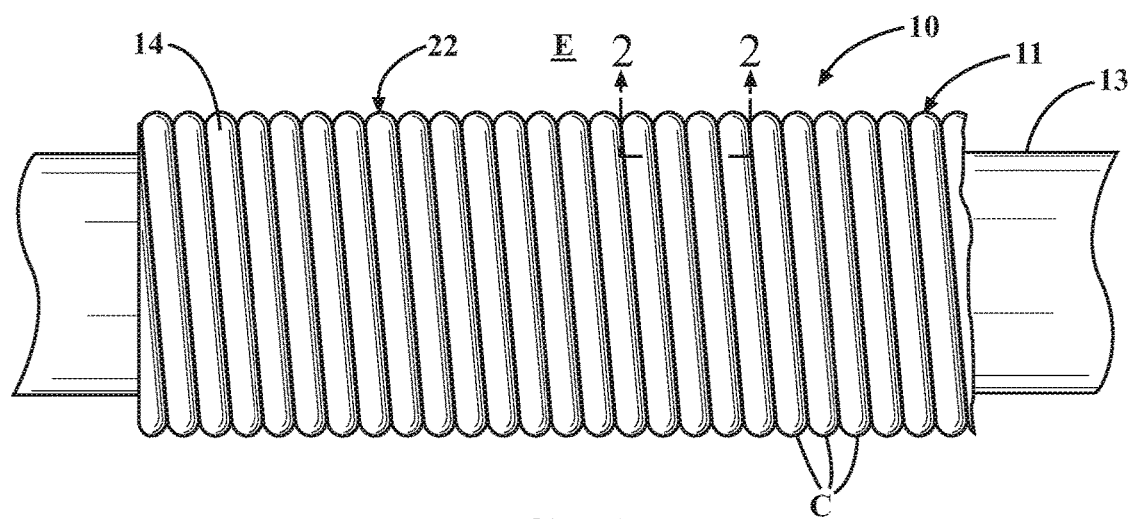
FIG. 1 is a side view of an insulative, flexible, durable reflective exhaust pipe sleeve constructed in accordance with one aspect of the invention shown disposed about an elongate member.
Figure 2:
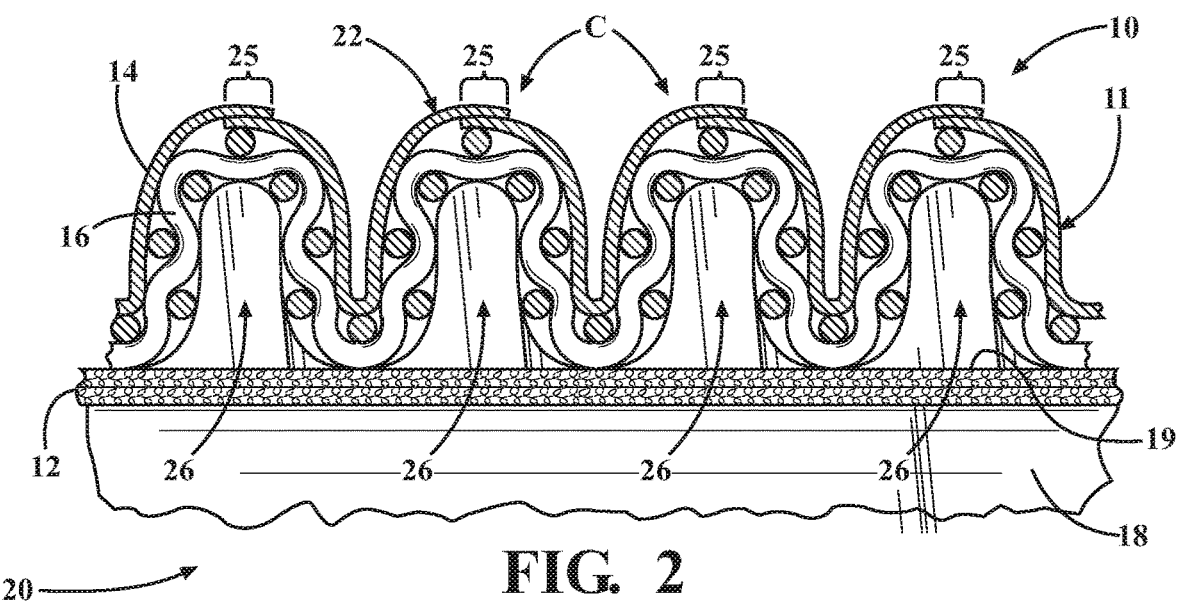
FIG. 2 is a cross-sectional side view taken generally along the line 2-2 of the sleeve of FIG. 1.

Referring in more detail to the drawings, FIG. 1 illustrates an insulative, flexible, durable reflective exhaust pipe sleeve 10 constructed in accordance with one aspect of the invention for minimizing the temperature drop of exhaust gasses traveling through an exhaust pipe 13. The sleeve 10 is resistant to damage from debris and fluid contamination, and also inhibits heat from radiating outwardly from the exhaust pipe 13. As best shown in cross-section of FIG. 2, the sleeve 10 includes a resilient wall 11 that may be crushed or otherwise compressed and then resiliently spring back or return to its as constructed tubular configuration without compromising the protective physical properties of the sleeve 10. As such, the sleeve 10 retains is useful shape and functionality even if inadvertently crushed or compressed, such as in storage, during shipment, during routing or while in use. These synergistic properties of the wall 11 are provided solely by an inner layer 12, an outer layer 14 and an intermediate layer 16 sandwiched between the inner and outer layers 12, 14, wherein at least one or more of the layers 12, 14, 16 are resilient.

The inner layer 12 is constructed having a cylindrically straight inner surface 18 and a cylindrically straight outer surface 19, wherein the inner surface 18 is exposed to an inner cavity 20 of the sleeve 10. The outer layer 14 is constructed having a reflective outer surface 22 exposed to the surrounding environment E. The intermediate layer 16 is constructed of a woven fabric and is sandwiched in abutment with the inner and outer layers 12, 14. The outer and intermediate layers 14, 16 are convoluted to provide the wall 11 with convolutes C immediately adjacent one another, thereby providing the sleeve 10 with an enhanced ability to be flexed and routed over meandering paths without becoming damaged or otherwise compromising the functionality of the sleeve 10. The convolutes C contribute to the improved thermal barrier properties of the sleeve 10 by effectively thickening the wall 11 in regions having folded portions of the convolutes C adjacent and abutting, or substantially abutting one another, and by forming air pockets 26 between the outer surface 19 of the inner layer 12 and the intermediate layer 16.

The inner layer 12 is constructed as a cylindrically tubular knit fabric from mineral fiber-based multifilaments. The knit stitches can be formed via interlocking, 1×1 rib, 2×2 rib or a combination of both patterns. The open knit structure of the inner layer 12 provides optimal thermal insulation properties, thereby minimizing conduction of heat to the intermediate and outer layers 16, 14. Further, being knit, the inner layer 12 is able to be readily installed about the exhaust pip 13 over meandering paths and about varying diameters of the pipe 13. Upon being inserted within the intermediate and outer layers 16, 14, the inner layer 12 remains cylindrically tubular, and thus, does not take on the convolute shape of the intermediate and outer layers 16, 14, thereby forming the air gaps 26.

The intermediate layer 16 is woven from fiberglass multifilament yarns. The weave pattern is preferably a plain weave, though it is contemplated herein that any desired weave pattern could be used, such as twill, basket, or otherwise.

The outer layer 14 is constructed from a metallic foil material. The metallic foil material can be provided as a composite lamination, or as a single sheet of metallic material. The metallic foil material can include various types of metal, including stainless steel or aluminum. Accordingly, if provided as a composite lamination, at least one metallic material is provided within the lamination, and further, is preferably present on the outer surface 22 to form a reflective surface, thereby facilitating the ability of the sleeve 10 to reflect radiant heat present in the environment E as well as to retain heat within the sleeve 10. Otherwise, if provided as a single, monolithic layer, the metallic material can be provided as steel foil or aluminum foil. Regardless of the type of metallic material, the outer layer 14 is provided as a thin layer, thus allowing the outer layer 14 to be readily compressed, while thereafter returning or substantially returning to its original tubular configuration under the bias of the inner and intermediate layers 12, 16. The outer layer 14 is wrapped about the intermediate layer 16 and can be bonded to itself at overlapping regions 25, such as by being spiral wrapped. The outer layer 14 can be coated with an adhesive prior to being wrapped about the intermediate layer 16, and thus the overlapping regions 25, upon coming into contact with one another, become adhere to one another.

In accordance with another aspect of the invention, a method of constructing the sleeve 10 is provided. The method includes, with reference to the layers discussed above, applying an adhesive to an inner surface of the outer layer 14 and then spiral wrapping the outer layer 14 about the tubular woven intermediate layer 16, thereby fixing overlapped edges of the outer layer 14 to one another and fixing the outer layer 14 to the intermediate layer 16.

Upon applying the resilient outer layer 14 about the tubular construction of the intermediate layers 16, the method further includes forming convolutes C in the outer and intermediate layers 14, 16 to provide the tubular configuration with an enhanced flexibility, insulative, and thermal barrier properties. Then, the cylindrically tubular inner layer 12 can be disposed inside the intermediate layer 16 and fixed thereto via a fastening mechanism, such as snaps, by way of example and without limitation.

Obviously, many modifications and variations of the present invention are possible in light of the above teachings. It is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A thermally insulative, flexible, durable reflective exhaust pipe sleeve for minimizing the temperature drop of exhaust gasses traveling through an exhaust pipe, comprising:
 a knit, heat-resistant inner layer, a reflective metallic outer layer and an intermediate layer sandwiched between said inner and outer layers, said inner layer having an inner surface exposed to an inner cavity of the sleeve and the outer layer is constructed having an outer reflective surface exposed to the surrounding environment, said intermediate layer is a woven material and is sandwiched in abutment with said inner and outer layers, wherein said outer and intermediate layers are convoluted to provide the sleeve with an enhanced insulative properties and flexibility to be routed over meandering paths.

2. The sleeve of claim 1, wherein said outer layer and said intermediate layer are bonded to one another with a thermoset adhesive.

3. The sleeve of claim 1, wherein said inner layer is knit from mineral fiber-based multifilaments.

4. The sleeve of claim 1, wherein said intermediate layer is woven from fiberglass multifilament yarns.

5. The sleeve of claim 1, wherein said outer layer is a metal foil fabricated from one of aluminum and stainless steel.

6. The sleeve of claim 1, wherein said outer layer has overlapping regions and non-overlapping regions, wherein said overlapping regions are bonded to one another.

7. The sleeve of claim 1, wherein said inner layer is cylindrically tubular.

8. A thermally insulative, flexible, durable reflective exhaust pipe sleeve for minimizing the temperature drop of exhaust gasses traveling through an exhaust pipe, consisting of:
   a knit, heat-resistant inner layer, a reflective metallic outer layer and an intermediate layer sandwiched between said inner and outer layers, said inner layer having an inner surface exposed to an inner cavity of the sleeve and the outer layer is constructed having an outer reflective surface exposed to the surrounding environment, said intermediate layer is a woven material and is sandwiched in abutment with said inner and outer layers, wherein said outer and intermediate layers are convoluted to provide the sleeve with an enhanced insulative properties and flexibility to be routed over meandering paths.

9. The sleeve of claim 8, wherein said inner layer is knit from mineral fiber-based multifilaments.

10. The sleeve of claim 8, wherein said intermediate layer is woven from fiberglass multifilament yarns.

11. The sleeve of claim 8, wherein said outer layer is a metal foil fabricated from one of aluminum and stainless steel.

12. The sleeve of claim 8, wherein said inner layer is not convolute and is cylindrically tubular.

13. A method of constructing an insulative, flexible, durable reflective exhaust pipe sleeve for minimizing the temperature drop of exhaust gasses traveling through an exhaust pipe, comprising:
   providing a cylindrically tubular knit, heat-resistant inner layer, a reflective metallic outer layer and a woven intermediate layer;
   bonding the intermediate layer and the outer layer to one another;
   forming the outer and intermediate layers having a convoluted shape; and
   disposing the cylindrically tubular inner layer inside the intermediate layer.

14. The method of claim 13, further including bonding the intermediate layer and the outer layer to one another with a thermoset adhesive.

15. The method of claim 13, further including providing the inner layer as a woven fabric knit from mineral fiber-based multifilaments.

16. The method of claim 13, further including providing the intermediate layer as a fabric woven from fiberglass multifilaments.

17. The method of claim 13, further including providing the outer layer as a metal foil formed from one of aluminum and stainless steel.

18. The method of claim 13, further including spiral wrapping the outer layer about the intermediate layer and bonding overlapped regions of the outer layer to one another.

* * * * *